United States Patent
Kusunoki

[11] Patent Number: 5,912,631
[45] Date of Patent: Jun. 15, 1999

[54] MISCHIEF PREVENTIVE AUTOMATIC DOOR LOCKING APPARATUS AND METHOD FOR USE WITH KEYLESS ENTRY SYSTEM IN AUTOMOTIVE VEHICLE

[75] Inventor: Kiichi Kusunoki, Atsugi, Japan

[73] Assignee: Nissan Motor Co., Ltd., Yokohama, Japan

[21] Appl. No.: 08/683,884

[22] Filed: Jul. 19, 1996

[30] Foreign Application Priority Data

Feb. 27, 1996 [JP] Japan .................................. 8-067256

[51] Int. Cl.⁶ .............................. G06F 7/04; G08B 23/00; B60R 25/10
[52] U.S. Cl. ................................ 340/825.31; 340/825.57; 340/825.72; 340/430; 340/528; 307/10.2
[58] Field of Search .................. 340/825.31, 825.32, 340/825.57, 825.69, 825.72, 426, 430, 528; 307/10.2

[56] References Cited

U.S. PATENT DOCUMENTS

| | | | |
|---|---|---|---|
| 4,477,806 | 10/1984 | Mochida et al. | 340/825.56 |
| 4,663,626 | 5/1987 | Smith | 340/825.69 |
| 5,134,392 | 7/1992 | Takeuchi et al. | 340/825.69 |
| 5,146,215 | 9/1992 | Drori | 340/825.69 |
| 5,172,094 | 12/1992 | Stadler | 307/10.2 |
| 5,278,547 | 1/1994 | Suman et al. | 340/825.31 |
| 5,319,364 | 6/1994 | Waraksa et al. | 340/825.31 |
| 5,412,370 | 5/1995 | Berman et al. | 307/10.2 |
| 5,477,214 | 12/1995 | Bartel | 340/825.31 |
| 5,481,253 | 1/1996 | Phelan et al. | 340/825.31 |
| 5,519,255 | 5/1996 | Burtch et al. | 307/10.2 |
| 5,568,120 | 10/1996 | LeMense et al. | 307/10.2 |
| 5,604,384 | 2/1997 | Carlo et al. | 307/10.2 |
| 5,608,272 | 3/1997 | Tanguay | 307/10.2 |
| 5,619,075 | 4/1997 | Spoto et al. | 307/10.2 |
| 5,663,704 | 9/1997 | Allen et al. | 307/10.2 |
| 5,684,454 | 11/1997 | Nishioka et al. | 307/10.2 |
| 5,710,548 | 1/1998 | LeMense | 340/825.31 |

*Primary Examiner*—Brian Zimmerman
*Assistant Examiner*—Edward Merz
*Attorney, Agent, or Firm*—Foley & Lardner

[57] ABSTRACT

In automatic door locking apparatus and method for an automotive vehicle for locking and unlocking vehicle doors, a first timer unit in a controller starts a counting operation of a first set time period responsive to an unlock signal generated by a comparator so arranged as to compare a signal received by a receiver of a keyless entry system from a transmitter carried by an authorized operator operated to transmit a coded unlock signal with a preset code stored in a memory so as to determine whether the received code matches the preset code and, upon a match, to generate the unlock signal. When the first set time period is passed with no door of the vehicle opened, the automatic door locking is carried out via a door lock actuator to lock the vehicle doors. However, in the automatic door locking apparatus and method, the first set time period is extended so as to extend the automatic door locking when an unlatched signal indicating that a trunk lid of the vehicle is unlatched during the counting of the first set time period is detected.

14 Claims, 7 Drawing Sheets

MISCHIEF PREVENTIVE AUTOMATIC DOOR LOCKING APPARATUS AND METHOD FOR USE WITH KEYLESS ENTRY SYSTEM IN AUTOMOTIVE VEHICLE

BACKGROUND OF THE INVENTION

1. Field of The Invention

The present invention relates to mischief preventive automatic (electronic) door locking apparatus and method for use with a keyless entry system in an automotive vehicle, the keyless entry system having a portable, wire-less transmitter by which a remote operation is carried out using pushbuttons on the transmitter so as to lock or unlock vehicle doors, in which when any vehicle door is not open after the unlocks of the vehicle doors, the doors are automatically locked.

2. Description of The Background Art

In a previously proposed vehicle automatic door locking apparatus for use with a keyless entry system, to prevent any vehicular door from being left unlocked due to an erroneous operation of a remote controller (also called, the portable, wire-less (radio) transmitter but hereinafter often simply called transmitter), a timer is started to measure a time at the simultaneous time when the unlocks of the vehicle doors caused by the remote operation of the remote controller is carried out. When any vehicular door is not open (all of the doors are closed) within a set time period of the timer, all of the vehicular doors are automatically locked. In this automatic door locking apparatus, after the unlocks of the doors are carried out through the remote operation of the remote controller in order for a user (an authorized operator) of the keyless entry system to try to ride the vehicle (to enter a vehicular passenger compartment) and, with any door left closed; the user of the keyless entry system performs loading and/or unloading operations of a baggage(s) into and/or from a vehicular trunk (trunk compartment), there is often a case such that the doors are automatically locked due to an unintentional (inadvertent) lapse of time set by the timer.

To prevent such an inconvenience as unlock (re-unlock) operations of the vehicular doors carried out again, in another previously proposed automatic locking apparatus for use with the keyless entry system, the vehicle trunk and the vehicle doors are interlocked together. If the trunk is caused to open at a time during a set period of time at an end of which the automatic locks for the vehicular doors are effected after the unlock operation of the doors, the automatic locks of the doors are canceled, i.e., the automatic locks for the vehicular doors are not carried out.

In the latter previously proposed automatic door locking apparatus, the doors would be left unlocked if the user did not ride the vehicle. In addition, if the unlocks of the vehicular doors are carried out after the unlock of the trunk compartment is carried out through the portable, wire-less transmitter (remote controller), the automatic locks for the vehicular doors are not carried out.

SUMMARY OF THE INVENTION

It is, therefore, an object of the present invention to provide an automatic door locking apparatus and method in an automotive vehicle which can prevent vehicular doors from being inadvertently, automatically locked while loading and/or unloading of a baggage(s) into and/or from a vehicular trunk compartment (hereinafter, also referred to as trunk), i.e., a working (operation) on the trunk is carried out and can prevent the vehicular doors from being left unlocked after the end of the loading and/or unloading operations (working) on the trunk.

The above-described object can be achieved by providing an automatic door locking apparatus for an automotive for locking and unlocking vehicle doors, comprising:

(a) a door lock actuator mounted in the vehicle for selectively locking and unlocking the vehicle doors;

(b) a transmitter carried by an authorized operator and, when operated, to transmit a coded unlock signal;

(c) a receiver, arranged in the vehicle, for receiving the signal from said transmitter, said receiver having a memory for storing a preset code;

(d) a comparator means for comparing the signal received with the preset code stored in the memory so as to determine whether the received code matches the preset code and, upon a match, to generate an unlock signal;

(e) a controller connected to said door lock actuator for outputting a door unlock command signal to said door lock actuator for unlocking the vehicle doors;

(f) a door switch for outputting a door-open signal when a door of the vehicle is opened;

(g) a first timer unit for starting a counting operation of a first set time period responsive to the unlock signal;

(h) means for automatically actuating said door lock actuator to lock the doors unless the door-open signal is outputted during the first set time period;

(i) a trunk unlatched state detector for determining whether a trunk lid is unlatched or not during said counting operation and, if sensed unlatched, for generating an unlatched signal; and (j) means for extending the first set time period when the unlatched signal is detected.

The above described object can also be achieved by providing an automatic door locking method for an automotive vehicle with a door locking apparatus comprising: (a) a door lock actuator mounted in the vehicle for selectively locking and unlocking vehicle doors; (b) a transmitter carried by an authorized operator and, when operated, to transmit a coded unlock signal; (c) a receiver, arranged in the vehicle, for receiving the signal from said transmitter, said receiver having a memory for storing a preset code; (d) a comparator means for comparing the signal received with the preset code stored in the memory so as to determine whether the received code matches the preset code and, upon a match, to generate an unlock signal; (e) a controller connected to said door lock actuator for outputting a door unlock command signal to said door lock actuator for unlocking the vehicle doors; (f) a door switch for outputting a door-open signal when a door of the vehicle is opened; and (g) a first timer unit for starting a counting operation of a first set time period responsive to the unlock signal, said automatic door locking method comprising the steps of:

actuating said door lock actuator to lock the doors unless the door-open signal is outputted during the first set time period;

determining whether a trunk lid is unlatched or not during said counting operation;

generating an unlatched signal if sensed unlatched at the determining step; and extending the first set time period when the unlatched signal is generated.

BEST MODE FOR CARRYING OUT THE INVENTION

Reference will hereinafter be made to the drawings in order to facilitate a better understanding of the present invention.

First Embodiment

Figure 1:
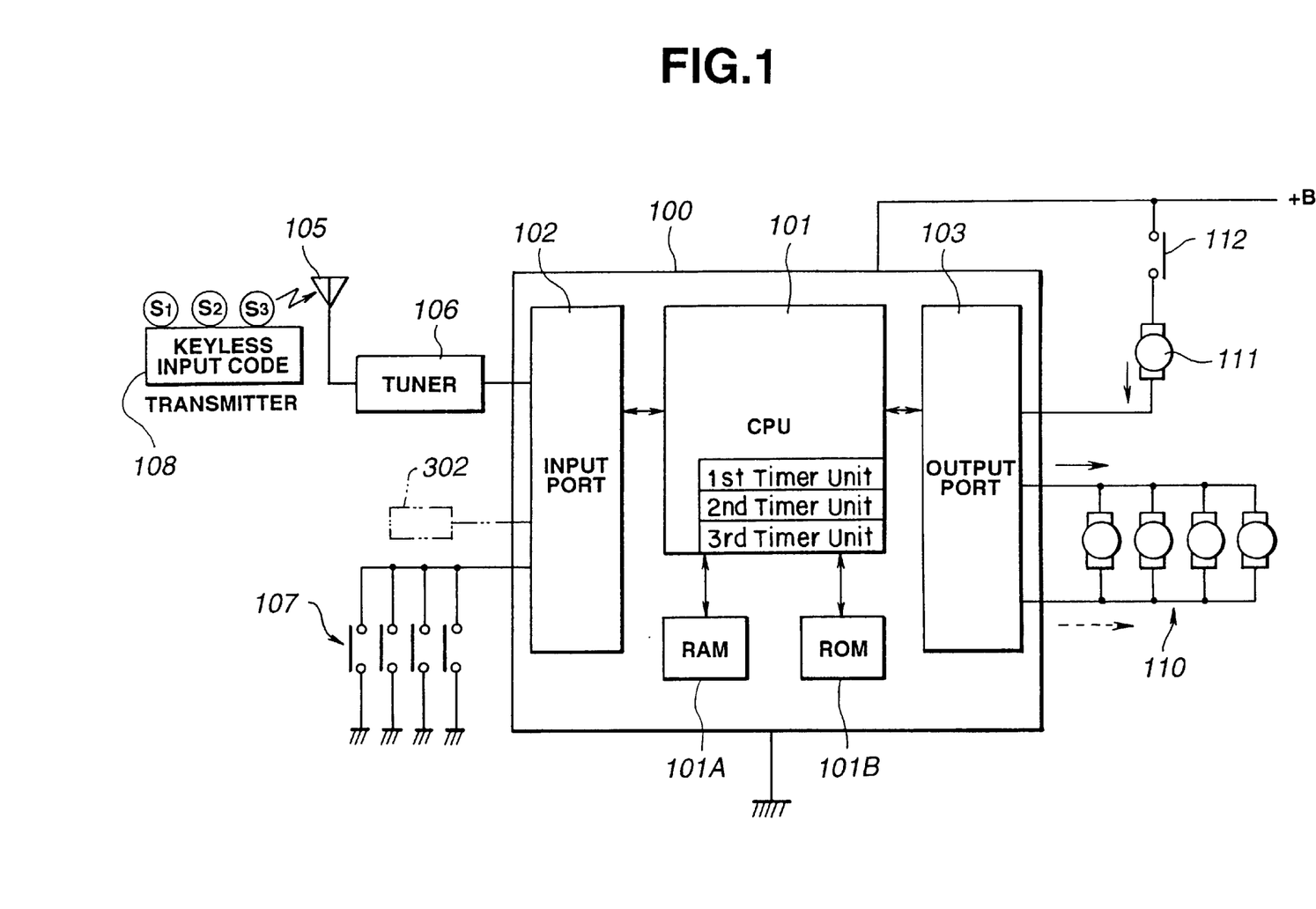
FIG. 1 is a simplified circuit block diagram of a first preferred embodiment of an automatic door locking apparatus for an automotive vehicle with a keyless entry system according to the present invention.

FIG. 1 shows a circuit block diagram of a keyless entry system in a vehicle to which a first preferred embodiment of an automatic door locking apparatus according to the present invention is applicable.

A controller 100 in a receiver of the keyless entry system mounted in an automotive vehicle (in this case, the vehicle has four doors) includes a microcomputer having: a processing unit (hereinafter, referred as to a CPU (Central Processing Unit) 101; an Input Port 102 to receive various signals (keyless input code from the tuner 106 an on state or off state signal from a door switch group 107); an Output Port 103 to output control (drive) signals (the control signal includes door lock (command) signal, door unlock (command) signal, and a trunk unlatch (command) signal as will be described later); a common bus; RAM (Random Access Memory) 101A; and a ROM (Read Only Memory) 101B. The ROM 101B may be EEPROM (Electrically Erasable Programmable Read Only Memory).

A tuner (demodulator) 106 is connected between an antenna 105 and the Input Port 102, which receives an electromagnetic wave addressed to the vehicle from a transmitter (a remote controller) 108, carried by an authorized operator (user), via its antenna 105 and inputs a coded signal (keyless input code) from the transmitter 108 to the CPU 101.

The transmitter 108 (carried by the authorized operator), in the first embodiment, includes push-buttons $S_1$, $S_2$, and $S_3$ attached thereonto and arranged for providing the keyless input code (coded signal) corresponding to a request to unlock the vehicle doors through a first one of the push-buttons $S_1$, when pushed, a request to lock the vehicular doors through a second one of the push-buttons $S_2$, when pushed, and a request to unlatch a vehicle trunk (trunk lid) through a third one of the push-buttons $S_3$, when pushed. The transmitter is also exemplified by a U.S. Pat. No. 5,134,392, the disclosure of which is herein incorporated by reference.

In addition, door switches (the door switch group) 107 are connected in parallel to each other to the Input Port 102. In this connection, the CPU 101 determines that all of the vehicle doors are closed (that is to say, any door is not opened) when all of the door switches 107 are in ON (conducted) states and that any door is open (caused to open, opened) if any of the door switches (door switch group) 107 is in OFF (disconnected) state via the Input Port 102.

Vehicle door locking and unlocking actuators 110 (four) are connected in parallel to each other and to the Output Port 103. The vehicular door locking and unlocking actuators 110 are hereinafter also referred to as a door lock actuator 110. The Output Port 103 is provided with, for example, an H-bridge circuit arranged for changing a direction of a current flow through the door locking and unlocking actuators 110 according to the corresponding command signal (door lock (command) signal or door unlock (command) signal) from the CPU 101 so as to selectively be actuated into either a locking position to lock the vehicular doors or an unlocking position to unlock the doors.

A trunk opener cancel switch 112 is inserted between a trunk unlatching actuator 111 and a bias supply +B for the receiver 100 including the tuner 106. With the trunk opener cancel switch 112 turned on (conductive state), the trunk unlatching actuator 111 is operated in response to the drive (trunk unlatch command) signal via the Output Port 103 so that the trunk (lid) is enabled to be opened. In this state, the Output Port 103 having, for example, a transistor is operated upon a receipt of a corresponding command signal (the trunk unlatch (command) signal) from the CPU 101 for the trunk (unlatching) actuator 111 to receive the bias (power) supply to be actuated into the unlatching position.

When the remote controller (portable, wire-less transmitter) 108 is remotely operated using any one of the push-buttons $S_1$, $S_2$, and $S_3$ the keyless input code with an ID code is received (keyless entry) from the antenna 105 via the tuner 106 into the controller 100 and the output control signals from the Output Port 103 serve to actuate the door locking actuator 110 to lock or unlock the doors and to actuate the trunk unlatching actuator 111 to unlatch the vehicle trunk lid.

Specifically, in the first embodiment, the keyless input code (usually formatted with the ID (identification) code) is transmitted from the transmitter 108 to the receiver 100. In the receiver side, the keyless input code (coded signal) is inputted through the antenna 105.

In the controller 100, a memory (ROM 101B) is arranged for storing at least one preset code, which can be read out in response to an input of the keyless code.

In addition, a comparator is arranged in the controller 100 for comparing the keyless input code derived from the tuner 106 with the preset code so as to determine whether the received code matches the stored preset code, and, upon a match, to generate an unlock signal (this signal corresponds to the determined request for unlocking vehicle doors).

The controller 100 outputs, responsive to the generation of the unlock signal of the comparator, the door unlock command signal to the vehicular door locking and unlocking actuators 110 for unlocking the vehicle doors. It is noted that the stored preset code may be plural, the preset codes corresponding to the request for locking the vehicular doors and the request for unlatching the trunk lid other than the preset code corresponding to the request for unlocking the vehicle doors as described above. In this case, the comparator compares the received code (keyless input code) with each of the stored preset code so as to determine whether the received code matches any one of the preset codes, and, upon a match, the comparator generates a lock signal or a unlatch signal (these signals correspond to the determined door lock request and the trunk unlatch request). Then, the CPU 101 outputs the door lock command signal or trunk unlatch command signal to the corresponding one of either the door lock actuator 110 or the trunk unlatching actuator 111.

The comparator may be constituted by a plurality of comparators, each comparator comparing the received coded signal from the transmitter 108 via the tuner 106 with the preset code which can be read out from the memory so as to determine whether the received code and the stored preset code match and, upon the match, to generate the door lock signal, the door unlock signal, or the unlatch signal from each corresponding one of the comparators as described above.

The functions of the memory, the comparator, and the preset code described above are exemplified by U.S. Pat. No. 4,477,806, the disclosure of which is herein incorporated by reference.

Figure 2:
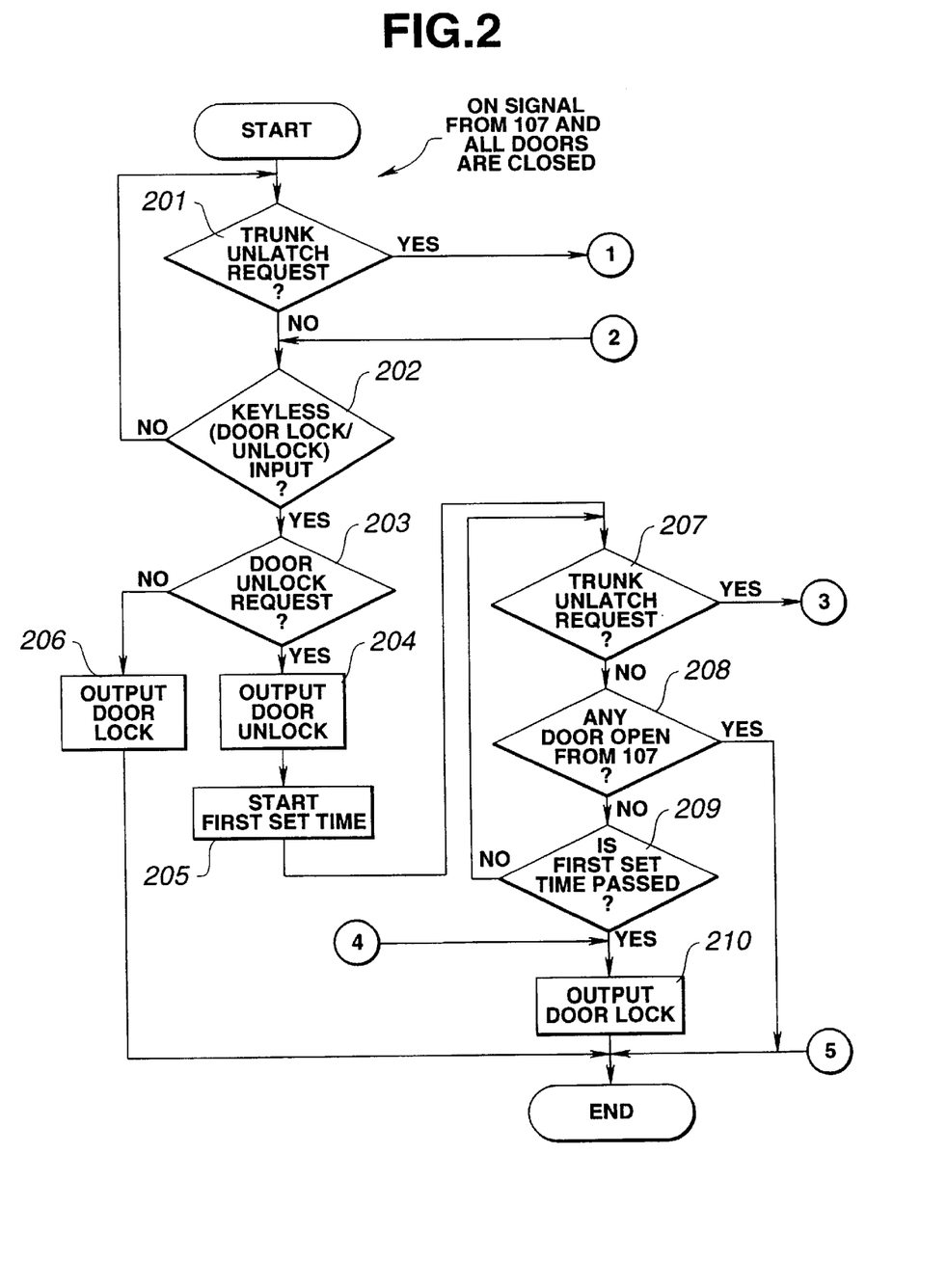
FIGS. 2 and 3 are integrally an operational flowchart executed by a CPU (Central Processing Unit) of a controller in the first embodiment of the automatic door locking apparatus shown in FIG. 1.
Figure 3:
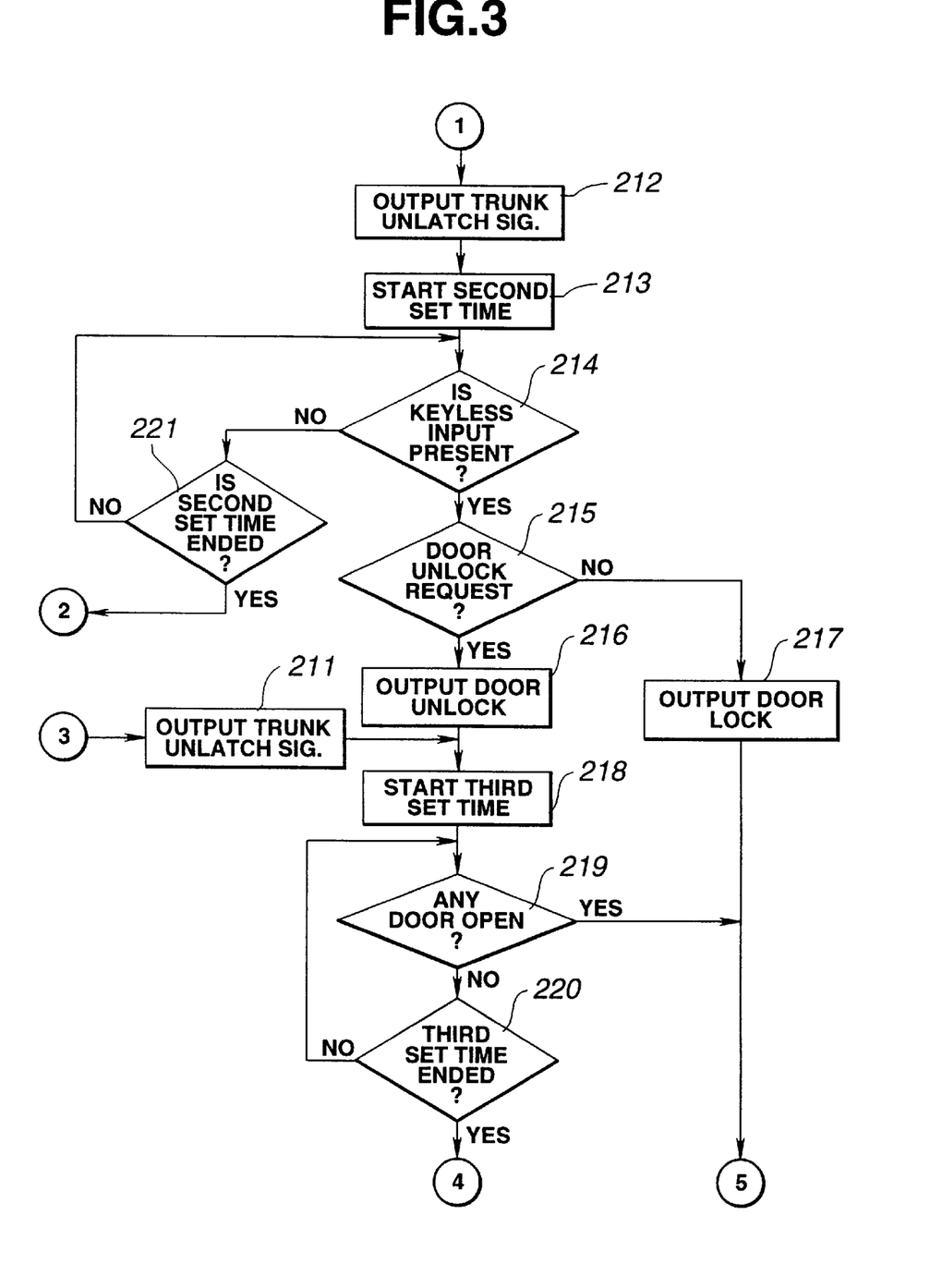

FIGS. 2 and 3 show integrally an operational flowchart executed by the CPU 101 (,i.e., controller 100) in the first preferred embodiment of the automatic door locking apparatus according to the present invention.

It is noted that the keyless entry control operation shown in FIGS. 2 and 3 is started whenever a vehicular engine is stopped (an engine ignition switch is turned off) and the ON state of the door switches 107 (hereinafter also referred to only as a door switch) is inputted to the Input Port 102 so that all of the vehicle doors are closed (any vehicle door is not opened).

At a step 201, the CPU 101 determines whether the keyless input code (the coded signal from the transmitter 108) which matches one of the stored preset codes corresponding to the request for unlatching the trunk lid is inputted via the Input Port 102 from the transmitter 108.

If, at the step 201, the keyless input code matching the stored preset code corresponding to the trunk unlatch request is not being received (No), the routine goes to a step 202.

At the step 202, the CPU 101 determines whether the keyless input code matching either of the stored preset codes corresponding to the door lock or unlock request for the vehicle doors is being inputted via the Input Port 102 or not.

Until either of the keyless input code matching the preset code corresponding to the requests for unlatching the vehicle trunk (lid) or for locking or unlocking the vehicular doors (either of the keyless input of the doors or trunk) is received, the steps 201 and 202 are repeated.

If either of the door lock or unlock request (i.e., the keyless input code on the vehicle doors is inputted) is received at the step 202 (Yes), the routine goes to a step 203.

If the keyless input code which matches the stored preset code corresponding to the door unlock request is issued (Yes) at the step 203, the routine goes to a step 204 in which the door unlock (command) signal is outputted from the CPU 101 via the Output Fort 103 to the door locking and unlocking actuators 110 so that the door locking and unlocking actuators 110 are actuated into the unlocking position (for example, the current flow, in this case, is denoted by a dotted line with an arrow mark in FIG. 1) for unlocking the doors and, at a to step 205, the CPU 101 starts a first timer unit (stored therein or RAM 101A) to count a first set time (period). Specifically, the CPU 101 sets the first timer unit's time to the first set time (period) and counts the time in a decrement manner, and when the first set time (period) is passed, the first timer unit is reset to the original value, i.e., the first set time period.

On the other hand, if the received keyless input code does not correspond to the door unlock request at the step 203 (No), the routine goes to a step 206 in which the door lock (command) signal is outputted from the CPU 101 to the door locking and unlocking actuators 110 via the Output Port 103 so that the vehicular doors are locked and the present routine is ended.

It is noted that since the first set time (period) corresponds to an automatic lock time duration upon an end of the first set time duration of which the vehicular doors are automatically locked through the door lock (command) signal after the door unlock operation according to the receipt of the keyless input code is carried out, the first set time (period) set by the first timer unit with no extension corresponds to, for example, approximately 30 seconds. The door unlock operations are carried out by the output of the drive signal (the command signal) to the door locking and unlocking actuators 110 via the Output Port 103 when the keyless input code is inputted and matches the stored preset code which corresponds to the request on the door unlock using the door locking and unlocking actuators 110 to be actuated into the unlocking position for unlocking the vehicle doors.

Next, the routine goes from the step 205 to a step 207 in which, during the counting of the first set time (period) by means of the first timer unit, the CPU 101 determines whether the keyless input code matching preset code corresponding to the trunk unlatch request is inputted into the controller 100 from the transmitter 108. If the keyless input code matching the stored preset code corresponding to the unlock request is not issued at the step 207 (No), the routine goes to a step 208 in which the CPU 101 determines whether the OFF input signal occurs from the door switches 107 so as to determine whether any door is open (opened) or not. If the CPU 101 determines that neither of the vehicle doors is open (any vehicular door is not open) at the step 208 (No), the routine goes to a step 209. At the step 209, the CPU 101 determines whether the counted first set time (period) is ended (the first set time (period) has passed) according to the counting result of the first timer unit. If the CPU 101 determines that the first set time (period) has not yet passed at the step 209 (No), the routine returns to the step 207 and the steps of 207, 208, and 209 are repeated until either one of the step 207, the step 208, or the step 209 answers yes.

If the CPU 101 determines from the counting result of the first timer (unit) that the first set time (period) has passed at the step 209 (Yes), the routine goes to a step 210 in which the door lock (command) signal is outputted via the Output Port 103 to the door locking and unlocking actuators 110 so that the vehicle door locking and unlocking actuators 110 are actuated into the locking position so as to lock the vehicle doors (the current flow at this time is denoted by a solid line with an arrow in FIG. 1). The output of the drive signal (the door lock (command) signal) from the CPU 101. (in the case of the step 210) is called the automatic locking of the vehicular doors.

On the other hand, if the keyless input code matching the stored preset code corresponding to the trunk unlatch request is issued from the transmitter 108 at the step 207 (Yes), the routine goes to a step 211 in which the trunk unlatch (command) signal (the control (drive) signal) is outputted from the CPU 101 to the trunk unlatching actuator 111 so as to unlatch the trunk lid. If any door is open at the step 208 (Yes), the present routine is ended. The unlatch of the trunk (lid) means that the trunk unlatching actuator 111 is actuated into the unlatching position so that the trunk lid is separated from a trunk unlatch mechanism at a part of the trunk in the vehicle body side.

If the CPU 101 determines according to the keyless input code (comparison result with each of the stored preset codes) that the keyless input code matching the stored preset code corresponding to the trunk unlatch request is received at the step 201 so as to unlatch the trunk lid before the keyless input code matching the preset code corresponding to the request for locking or unlocking the vehicular doors at the step 202 is inputted (Yes at the step 201), the routine goes to a step 212 in which the trunk unlatch (command) signal is outputted from the CPU 101 via the Output Port 103 to the trunk unlatching actuator 111 so that the trunk lid is unlatched (the trunk is enabled to be opened).

At the next step 213, the CPU 101 starts a second timer unit (stored therein or RAM 101A) to count a second set time (period). Since the second set time (period) corresponds to a keyless input code transmission enabling time duration during which the user would indicate the intention to try to ride the vehicle after the trunk is opened, the second set time (period) is, for example, set to approximately 8 seconds.

At the next step 214, the CPU 101 determines whether the keyless input code on the door lock or unlock request occurs or not. That is to say, each comparator in the controller 100 compares the keyless input code with the stored preset code and the CPU 101 outputs the drive signal when the keyless input code matches the preset code corresponding to the vehicular door lock or unlock request. If the keyless input code on the door lock or unlock request occurs at the step 214 (Yes), the routine goes to a step 215 in which the CPU 101 determines whether the keyless input code on the door unlock request is received from the transmitter 108. If the received keyless input code determined at the step 214 indicates the stored preset code corresponding to the door unlock request at the step 215 (Yes), the routine goes to a step 216 in which the door unlock (command) signal is outputted via the output Port 103 to the door locking and unlocking actuators 110 so as to be actuated into the unlocking position. If the CPU 101 determines that the received keyless input code does not match the stored preset code corresponding to the door unlock request at the step 215 (No), the routine goes to a step 217 in which the door lock (command) signal is outputted to the door locking and unlocking actuators 110 via the Output Port 103 so as to be actuated into the locking position and the present routine is ended. The drive signal derived from the controller 100 includes the door lock and unlock (command) signals and the trunk unlatch (command) signal in the first embodiment.

When the door unlock (command) signal is outputted at the step 216 as described above or when the trunk unlatch (command) signal is outputted at the step 211, the routine goes to a step 218 in which the CPU 101 starts a third timer unit (stored therein or RAM 101A) to count a third set time (period) since the CPU 101 determines, at either the step 211 or the step 212 that the trunk lid is unlatched.

The third set time (period) corresponds to a working time (operation time duration) sufficient for the user (the authorized operator, for example, the vehicle driver) to load and/or unload a baggage(s) into or from the open trunk with the vehicular doors unlocked and is set to, for example, approximately 80, seconds.

At the next step 219, the CPU 101 determines whether any door is open or not depending on whether the OFF input occurs from the door switches 107 (door switch group).

If any door is not open (No) at the step 219, the routine goes to a step 220 in which the CPU 101 determines from the counting result of the third timer unit whether the third set time (period) has passed. When the third set time (period) has passed with any door not open (Yes at the step 220), the routine goes to the step 210 in which the door lock (command) signal is outputted to the door locking and unlocking actuators 110 so as to be actuated into the locking position to lock the vehicular doors and the present routine is ended.

If any door is open at the step 219 (Yes at the step 219), the present routine is ended.

Referring back to FIG. 2, if the trunk unlatch request is issued according to the keyless input code matching the corresponding preset code at the step 207, the routine goes to the step 211 in which the trunk unlatch (command) signal is issued so that the trunk lid is unlatched. After the trunk unlatch (command) signal is issued at the step 211, the routine goes to the step 218. As described above, the steps of 219 and 220 are repeated and the routine goes to the step 210 when the third set time (period) has passed with any door being not open at the step 208.

In addition, if the keyless input code on the lock or unlock on the vehicular doors is not present (No) at the step 214, the routine goes to a step 221 in which the CPU 101 determines from the counting result of the second timer unit whether the second set time (period) has passed. While the second set time (period) has not passed at the step 221 (No), the routine returns to the step 214 to determine whether the keyless input code on the door lock or unlock request occurs or not. If the keyless input code on the door lock or unlock request does not occur and the second set time has passed (Yes) at the step 221, the routine goes to the step 202.

Figure 7A:
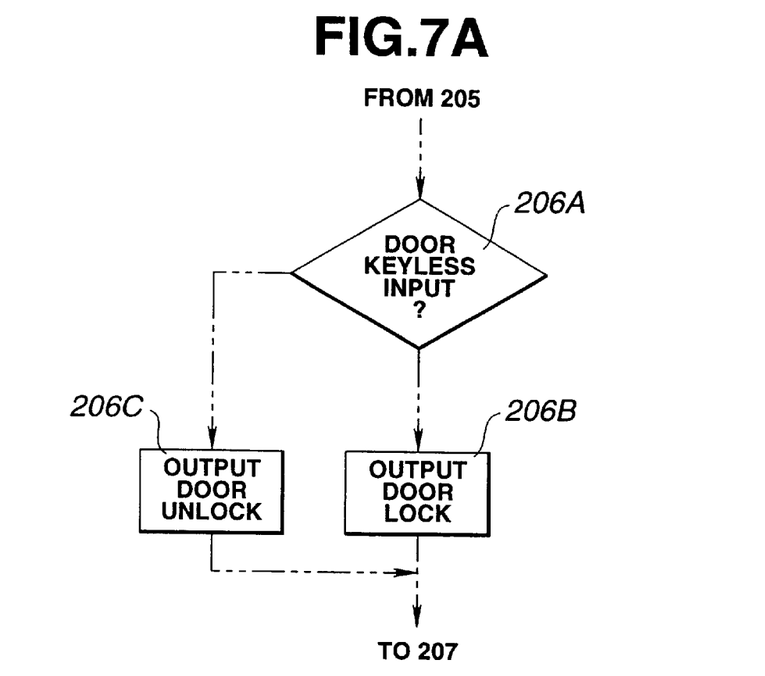
FIGS. 7A and 7B are parts of a flowchart to be added in the flowchart shown in FIGS. 2 and 3 as an alternative of the first embodiment.
Figure 7B:
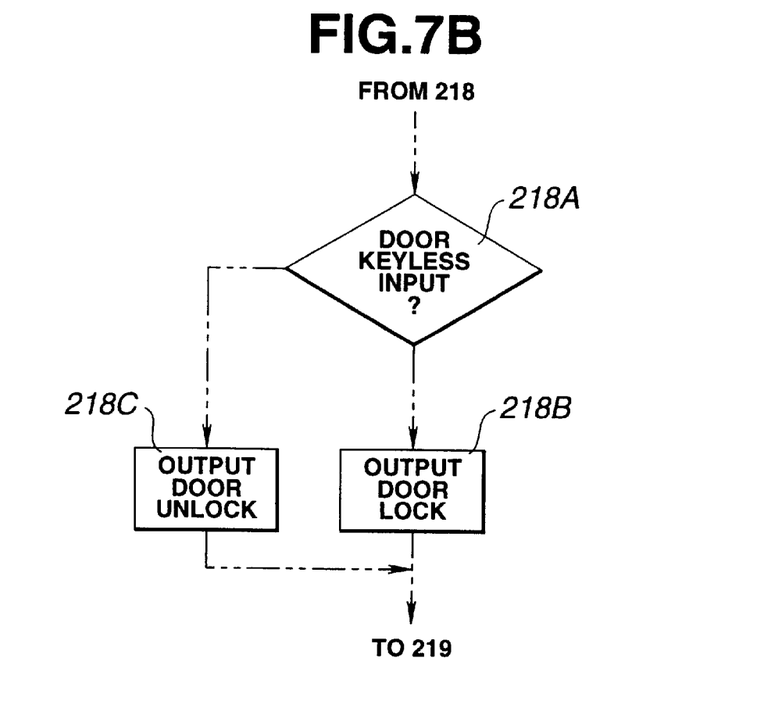

Alternatively, as shown in FIGS. 7A and 7B, additive steps 206A, 206B, and 206C between the step 205 and the step 207 may alternatively be interposed in which the CPU 101 determines whether the keyless input code on the doors (door lock or unlock request) is present or not after the counting of the first set time (period) is started or another additive steps 218A, 218B, and 218C between the step 218 and the step 219 may alternatively be interposed in which the CPU 101 determines whether the keyless input on the doors (door lock or unlock request) is present or not after the count start of the third set time (period).

If the keyless input code on the doors (door lock or unlock request) is present, the automatic locking function of the vehicular doors may be canceled at this time. According to the keyless input code (door lock or unlock request) at each of the interposed steps 208A through 206C, the lock signal or unlock (command) signal is outputted to the door locking and unlocking actuators 110.

As described above in the first embodiment, the automatic vehicular door locking is carried out at the step 210 if the keyless input code matching the preset code corresponding to the request for unlatching the vehicle trunk lid is not received during the counting of the first set time (period) by the first timer unit and if any door is not open during the counting of the first set time (period) by the first timer unit.

If the trunk unlatch request is present (Yes at the step 207) while the first set time (period) is counted, the trunk lid is unlatched and the third set time (period) is counted. If the third set time (period) has passed (Yes at the step 220), the automatic vehicular door locking is carried out at the step 210 if any vehicular door is not open (No at the step 219) during the counting of the third set time (period) by the third timer unit.

If, at first, the trunk unlatch request is issued (at the step 201), the trunk is enabled to be opened (the trunk lid is unlatched) so as to start the counting of the second set time (period). After the counting of the second set time (period) is started, the door lock or unlock request is waited from the received coded signal (keyless input code). While the counting of the second set time (period), the door unlock request is present and the third set time (period) is started to be counted.

Hence, the vehicle doors are not automatically locked during the working time on the trunk by setting the new third set time (period) such that the third set time has passed after the trunk is latched upon the end of the working (loading and/or unloading of the baggage(s) onto and/or from the trunk). In addition, since the doors are automatically locked after the end of the loading and/or unloading baggage(s) into and/or from the trunk, the vehicle doors are not left unlocked.

In summary, the timing of the door lock (command) signal to automatically lock the vehicle doors after the door unlock command signal responsive to the determined unlock request is outputted to unlock the vehicle doors can be extended by counting the third set time (period) as an extended time period of the first set time.

Although, in the first preferred embodiment, the CPU 101 determines whether the trunk is open (the trunk lid is unlatched or not) according to whether the keyless input code matching the stored preset code on the request for unlatching the trunk lid is received from the transmitter 108, a signal derived from a trunk switch 302 used to determine whether the trunk is opened or closed (unlatched or latched) in a second preferred embodiment (described later) may alternatively be used.

It is noted that the steps 207 and 211 are deemed as a vehicle trunk unlatched state detector (determinator) arranged for determining whether the vehicle trunk lid is unlatched (open) or latched (closed) during the counting operation of the first set time period and the steps 207 and 211 indicate the trunk lid unlatched state. At the steps 207 and 211, the vehicle trunk unlatched state detector is deemed to generate an unlatched signal since the trunk lid is unlatched at the step 211.

Even if the trunk (lid) is turned from the unlatched state to the closed (latched) state during the counting of the third set time (period) by the third timer unit, the automatic locking of outputting the door lock signal is carried out at the end of the counting of the third set time (period) at the step 210 provided that any vehicular door is not open with closure of the trunk since the third set time (period) is set with the sufficient working time on the trunk (loading and unloading operations for the baggages on the trunk (compartment)) taken into consideration.

It is also noted that the first, second, and third timer units are initially set to the first, second, and third set time (period) values, respectively, and counted down in a decrement manner toward zero. If each of the answers in the steps 207, 208, 214, and 219 is positive (Yes), the first, second, and third timer unit are reset to the first set time (period) value, the second set time (period) value, and the third time (period) value, respectively. The door switch (door switch group) 107 outputs (to the controller 100) a door-open signal indicating that a door of the vehicle is opened and outputs a door-closed signal indicating that the vehicle doors are closed.

Second Embodiment

Figure 4:
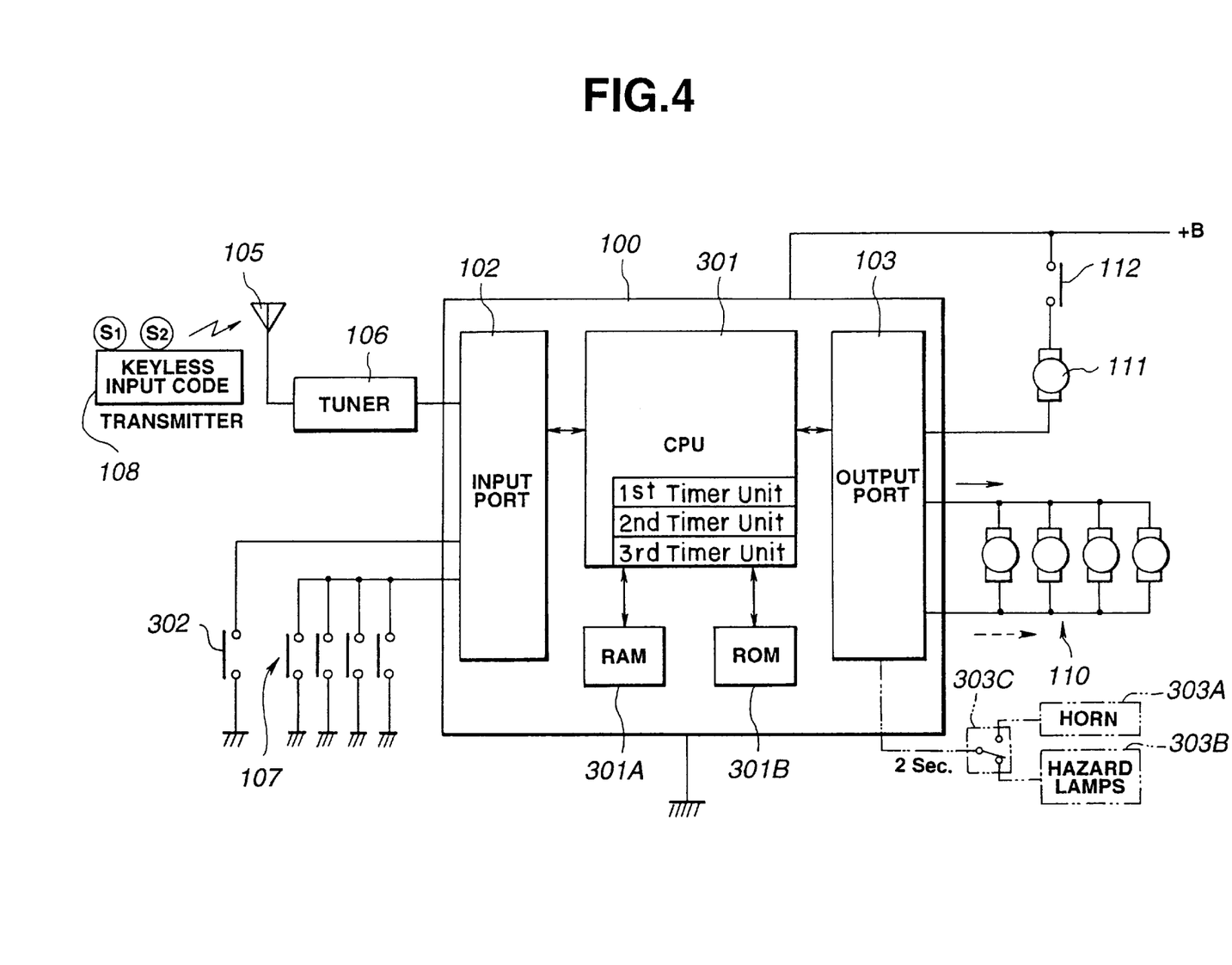
FIG. 4 is a simplified circuit block diagram of a second preferred embodiment of the automatic door locking apparatus for use with the keyless entry system in the vehicle according to the present invention.

Next, FIG. 4 shows a circuit block diagram of the keyless entry system to which the automatic door locking apparatus in the second embodiment according to the present invention is applicable.

The second embodiment is applicable to the trunk which is open (the trunk lid is unlatched) using a key inserted into a key cylinder of the trunk unlatch mechanism (the key can be carried by the user). In the second embodiment the trunk switch 302 is added to the structure of the automatic door locking apparatus in the first embodiment shown in FIG. 1. The second embodiment is also applicable to the keyless entry system having the transmitter 108 having no trunk unlatching push-button. Therefore, the first push-button $S_1$ in FIG. 4 serves to provide the keyless input code (coded signal) on the vehicular door unlock request, when pushed, and the second push-button $S_2$ in FIG. 4 serves to provide the keyless input code on the vehicular door lock request, when pushed.

The trunk switch 302 may be constituted by a normally used trunk compartment (room) lamp (luggage boot lamp) switch which is used to illuminate (turn on) a conventional trunk (compartment) room lamp (luggage boot lamp) when the trunk (lid) is opened by a predetermined angle with respect to the trunk compartment part of the vehicle body. The open (OFF state) of the trunk switch 302 indicates the open of the trunk (this is deemed for the trunk lid to be unlatched) and the closure (ON state) indicates the closure of the trunk (this is deemed for the trunk lid to be latched). The trunk switch 302 may alternatively be constituted by a trunk key cylinder switch (namely, a trunk unlatch detecting switch). The trunk switch 302 constitutes the trunk unlatched state detector.

The second embodiment is applicable to a case where the keyless input code on the trunk unlatch request is not carried out through the remote controller (portable, wire-less, transmitter 108) (namely, the trunk is open by means of only the key without the keyless input code and, therefore, the third push-button $S_3$ is omitted in FIG. 4), or in a case where the trunk opener cancel switch 112 is operated (turned off).

In either case, the CPU 301 receives the information such that the trunk has been opened when the trunk switch 302 connected to the Input Port 102 is turned to the OFF state (open).

The other structure is the same as the first preferred embodiment. It is noted that the RAM 301A and the ROM 301B is connected to the CPU 301 via the common bus.

Figure 5:
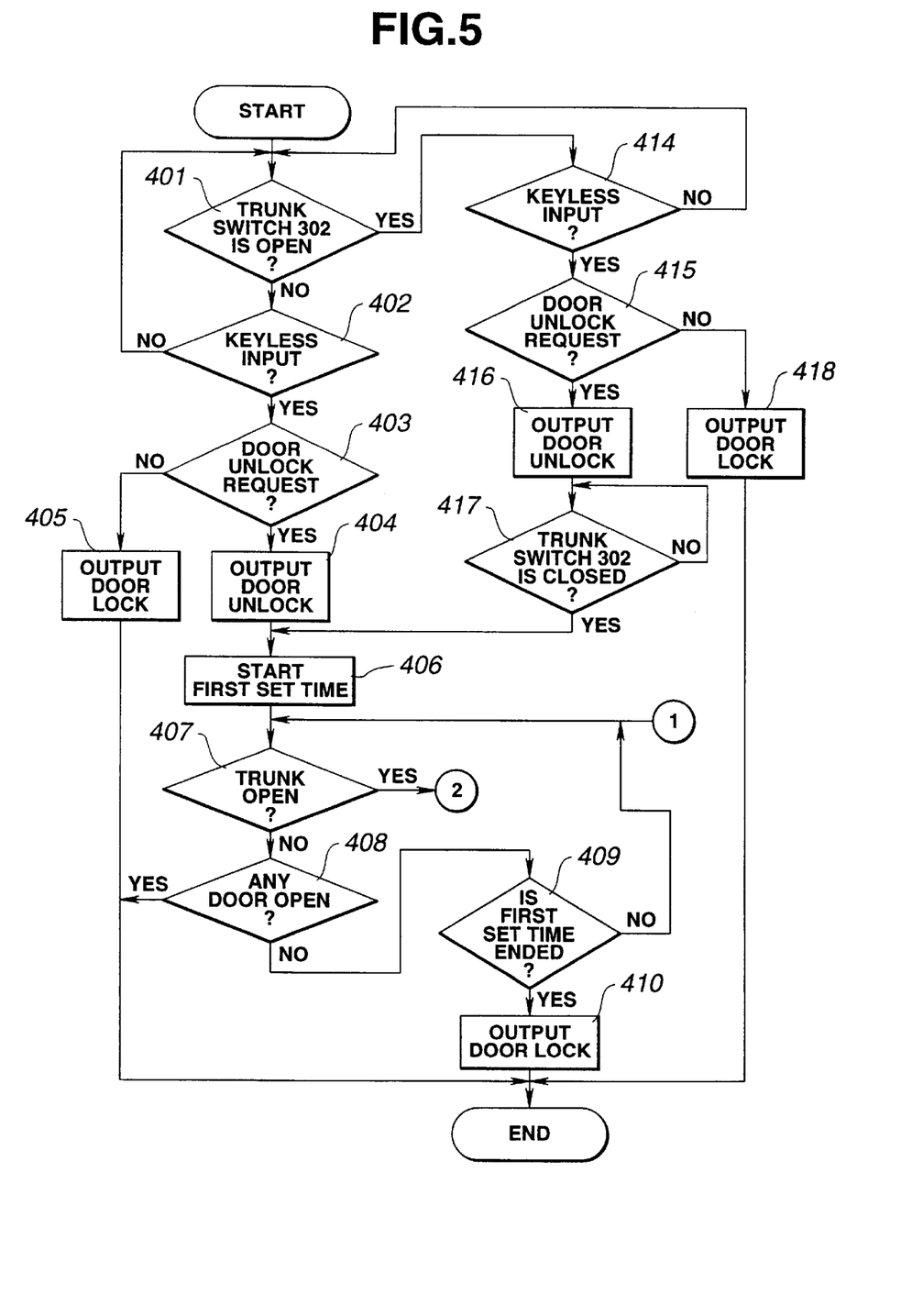
FIGS. 5 and 6 are integrally another operational flowchart executed by the CPU of the controller in the second preferred embodiment of the automatic door locking apparatus shown in FIG. 4.
Figure 6:
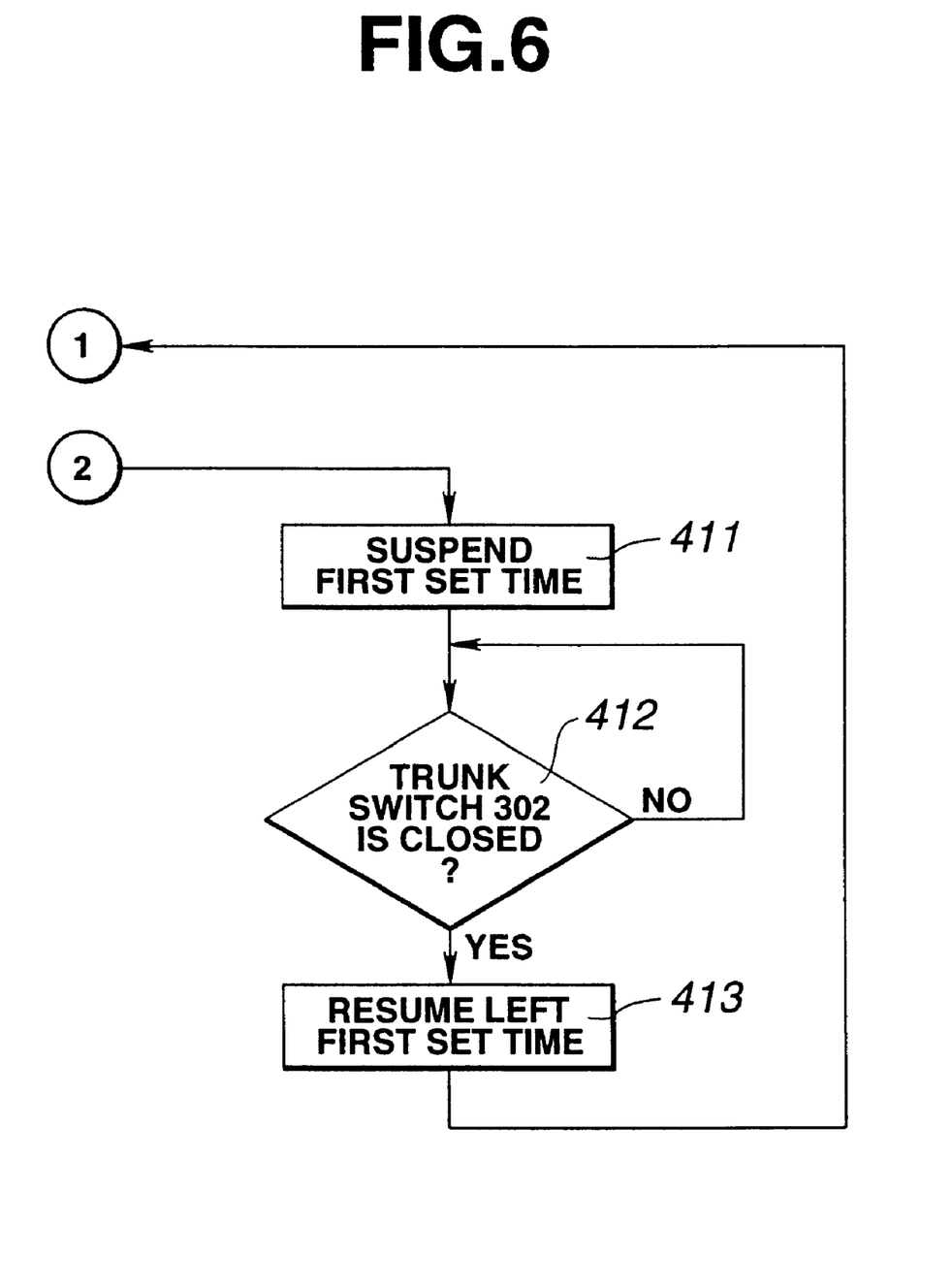

FIGS. 5 and 6 show integrally a flowchart executed by the CPU 301 in the second embodiment.

The flowchart shown in FIGS. 5 and 6 is started when the vehicular engine is stopped, the ON state signal from the door switches 107 is received indicating that all of the doors are closed (any vehicular door is not open) in the same way as the first embodiment.

At a step 401, the CPU 301 determines whether the trunk is open or closed (unlatched or latched) according to the ON state (signal) or OFF state of the trunk switch 302.

If the trunk is not open (latched) (No at the step 401), the routine goes to a step 402.

At the step 402, the CPU 301 determines whether the keyless input code matching the preset code corresponding to the request for locking or unlocking the vehicle doors is received or not from the transmitter 108. The keyless input code is also referred to as a coded unlock signal or coded lock signal.

If the keyless input code on the door lock or unlock request is not received (No at the step 402), the routine returns to the step 401, waiting until the keyless input code receipt described at the step 402 occurs. If the keyless input code is received at the step 402 (Yes), the routine goes to a step 403.

At the step 403, the CPU 301 determines whether the received keyless input code at the step 402 matches the stored preset code corresponding to the unlock request of the vehicle doors. That is to say, as described in the first embodiment, the keyless input code is compared with each of the stored preset codes so as to determine whether the received code matches the preset code and, upon a match, to generate the unlock signal or the lock signal. The plurality of comparators, as described in the first embodiment, may be provided to determine the received code signal matches the stored preset code on the corresponding comparator. The unlock and lock signals described above correspond to the request for unlocking or locking the vehicle doors. If the keyless input code matches one of the preset codes which corresponds to the unlock request of the doors at the step 403 (Yes), the routine goes to a step 404. If the CPU 301 determines that the received keyless input code matches the preset code corresponding to the request for locking the vehicle doors at the step 403 (No), the door lock (command) signal is outputted to the door locking and unlocking actuators (door lock actuator) 110 so as to be actuated into the locking position at a step 405 and the present routine is ended.

At the step 404, the door unlock (command) signal is outputted from the CPU 301 to the vehicle door locking and unlocking actuators 110 so as to be actuated into the unlocking position (to unlock the vehicle doors).

At the same time when the door unlock (command) signal is outputted at the step 404, the CPU 301 starts the first timer unit to count the first set time (period) at the next step 406 (this step may be deemed to be responsive to the unlock signal generated by the comparator).

Next, at the next step 407, the CPU 301 determines whether the trunk is open (the trunk lid is unlatched) according to the ON or OFF state of the trunk switch 302 during the counting operation of the first set time period. If the trunk is not opened (the trunk lid is latched) (No) at the step 407, the routine goes to a step 408.

If any vehicle door is not open (No) (the door-closed signal is received from the door switch 107) at the step 408, the routine goes to a step 409. If any vehicle door is open (Yes) at the step 408, the present routine is ended.

At the step 409, the CPU 301 determines from the counting result of the first timer unit whether the first set time (period) is ended (passed). If not ended at the step 409 (No), the routine returns to the step 407. The steps 407 and 408 are repeated until the first set time (period) is ended. When the first set time (period) has passed at the step 409 without opening of any vehicler door at the step 408, the routine goes to a step 410 in which the door lock (command) signal is outputted from the CPU 301 to the vehicular door locking and unlocking actuators 110 to (automatically) lock the vehicle doors. Then, the present routine is ended.

In addition, in a case where the trunk is open (the trunk lid is unlatched) at the step 407 after the received keyless input code indicates the door unlock request (Yes at the step 403) and the door unlock (command) signal is outputted at the step 404, the routine goes to a step 411 in which the CPU 301 suspends the counting operation of the first set time (period) by the first timer unit (temporarily halt of the counting of the first set time period) by the first timer unit.

At the next step 412, the CPU 301 determines whether the trunk switch 302 is, in turn, closed (the trunk is not unlatched) during the suspension of the counting operation of the first set time (period) by the first timer unit.

The step 412 is repeated until the CPU 301 determines that the vehicle trunk is latched according to the closure of the trunk switch 302.

In a case where the trunk is closed (latched) (Yes) at the stop 412, the CPU 301 restarts the first timer unit to count the remaining time of the first set time (period) (resume the left first set time) at a step 413 and the routine returns to the step 407. The remaining time is the result of the subtraction of the value of the first set time (period) at the step 411 from the first set time (period). If the remaining time is very small at the step 411, the CPU 301 may restart the counting (operation) of the original first set time (period) by the first timer unit.

On the other hand, in a case where the trunk switch 302 is open at the step 401 (Yes) (the vehicle trunk lid is unlatched), the routine goes to a step 414 in which the keyless input code matching the stored preset code corresponding to the door lock request or door unlock request is received from the transmitter 108.

If the keyless input code on the lock or unlock request for the doors occurs at the step 414 (Yes), the routine goes to the next step 415 in which the CPU 301 determines whether the received keyless input code matches the stored preset code corresponding to the door unlock request or the door lock request. If not received (No) at the step 414, the routine returns to the step 401.

If the received keyless input indicates the is door unlock request (Yes) at the step 415, the routine goes to a step 416.

At the step 416, the door unlock (command) signal is outputted to the door locking and unlocking actuators 110 so as to be actuated into the unlocking position for unlocking the vehicle doors.

At the next step 417, the CPU 301 determines whether the trunk is closed (the trunk lid is latched) (trunk switch 302 is closed).

The routine goes from the step 417 to the step 406 waiting for the closure (not unlatched state of the trunk lid) of the trunk.

On the other hand, if the received keyless input code matches the stored preset code corresponding to the lock request for the vehicular doors at the step 415 (No), the routine goes to a step 418 in which the door lock (command) signal is outputted to the door locking and unlocking actuators 110 for locking the vehicle doors.

Although, in the flowchart of FIG. 6, the suspension of the first set time at the step 411 may be replaced with such a content that the CPU 301 makes a stop of counting operation of the first set time (period) when the trunk lid is unlatched and the counted first set time is reset to the original first set time. In this alternative case of the second embodiment, the step 413 may be eliminated and the routine may return from the step 412 to the step 406. In the second embodiment, in the way described above, the first set time period (approximately 30 seconds) is extended since the trunk lid unlatched state has occurred (the trunk compartment has been opened during the counting of the first set period time.

In addition, in the same way as the alternative of the first embodiment, the CPU 301 may determine whether the keyless input code matching the stored preset code corresponding to the lock or unlock request of the vehicle doors is received after the start of counting operation of the first set time (period) at the step 406.

Then, if the keyless input code which matches the stored preset code corresponding to the door lock or unlock request is received during the counting operation of the first set time (period) in the second embodiment, the automatic door locking function of the vehicle doors may alternatively be canceled.

According to the content of the keyless input code, in the above alternative case, the door lock (command) signal or the door unlock (command) signal may be outputted to the door locking and unlocking actuators 110 for locking or unlocking the vehicle doors.

In the second embodiment, in a case where the vehicular doors are unlocked in response to the input of the keyless input code with the trunk left open (the CPU 301 determines that the trunk is left unlatched according to the open of the trunk switch 302), the counting of the first set time may be started at a time when the CPU 301 determines that the trunk is, in turn, closed (latched).

After the counting operation of the first set time (period) is started and the trunk is opened, the counting of the first set time (period) is suspended or stopped. Thereafter, when the trunk is, in turn, closed (the CPU 301 determines that the trunk lid is latched), the remaining time of count of time is resumed or the counting operation of the first set time by the first timer unit is restarted. When the first set time (period) has passed with the vehicle doors left closed, the doors are automatically locked.

Hence, a sufficient time is secured to provide the working on the trunk (loading and/or unloading of the baggage from and/or into the trunk) so that any vehicle door is not inadvertently locked during the trunk working time. In addition, after the trunk working time is ended, the vehicular doors are not left in the unlocked states (with the vehicular doors locked).

In summary, the counting of the first set time (period) in the second embodiment is suspended when the trunk is open (the trunk lid is unlatched) and is resumed when the opened trunk is, in turn, closed (the trunk lid is latched) so that the timing of the drive signal (automatic door lock signal) to the door locking and unlocking actuators 110 (the automatic lock of the vehicle doors) is extended.

FIG. 4 shows the vehicular trunk unlatching actuator 111 and the trunk opener cancel switch 112. However, the mechanical trunk unlatching actuator (mechanism) with the key insertion cylinder may alternatively be used. The vehicular trunk unlatched state detector includes the trunk switch 302.

Next, a brief aural by the car horn (303A in FIG. 4), or visual alert signal by flashing the hazard lamps (303B in FIG. 4), may be provided shortly, for example, two seconds, after the trunk is shut again. This will notice the driver that doors remain in an unlocked state and will be automatically re-locked after the predetermined time of 30 seconds. (The predetermined time corresponds to the first set time (period)). This feature should be regarded extremely convenient in that the driver will be reminded that the door may be opened easily, i.e., without using his transmitter even with full packages from the trunk compartment in the arms. Moreover, the driver, if he or she has now changed his or her mind and wishes to leave the vehicle, he or she may be prompted to operate the lock button (S$_2$) on the transmitter (108) without relaying on the automatic re-lock operation so that the vehicle will be immediately secured. The aural signal may be, though desirable, could be omitted without affecting the generation of the visual signal. Alternatively, the aural signal may be selectively generated by a switch (303C in FIG. 4) operable by the operator.

Although the car horn (303A), the hazard lamps 303B, and the switch (303C) connected to the Output Port 103 in FIG. 4 in the second embodiment, these circuit elements and connection are applicable to FIG. 1 in the first embodiment.

An unlatched signal may correspond to the OFF signal from the trunk switch 302. The automatic door locking means may correspond to the controller 100 executing the step 210 in the first embodiment and executing the step 410 in the second embodiment. The first set time period extending means may correspond to the controller 100 executing the step 207 (Yes), the step 211, the step 218, the step 219 (No), and the step 220 in the first embodiment and executing the step 407 (Yes), the step 411, the step 412, the step 413, the step 408 (No), and the step 409.

What is claimed is:

1. An automatic door locking apparatus for an automotive for locking and unlocking vehicle doors, comprising:

(a) a door lock actuator mounted in the vehicle for selectively locking and unlocking the vehicle doors;

(b) a transmitter carried by an authorized operator and, when operated, to transmit a coded unlock signal;

(c) a receiver, arranged in the vehicle, for receiving the signal from said transmitter, said receiver having a memory for storing a preset code;

(d) a comparator means for comparing the signal received with the preset code stored in the memory so as to determine whether the received code matches the preset code and, upon a match, to generate an unlock signal;

(e) a controller connected to said door lock actuator for outputting a door unlock command signal to said door lock actuator for unlocking the vehicle doors;

(f) a door switch for outputting a door-open signal when a door of the vehicle is opened;

(g) a first timer unit for starting a counting operation of a first set time period responsive to the unlock signal;

(h) means for automatically actuating said door lock actuator to lock the doors unless the door-open signal is outputted during the first set time period;

(i) a trunk unlatched state detector for determining whether a trunk lid is unlatched or not during said counting operation and, if sensed unlatched, for generating an unlatched signal; and (j) means for extending the first set time period when the unlatched signal is detected.

2. An automatic door locking apparatus for an automotive vehicle for locking and unlocking vehicle doors as claimed in claim 1, which further comprises a trunk unlatching actuator which is operatively actuated into an unlatching position so as to unlatch the trunk lid, wherein said controller is connected to said trunk unlatching actuator for outputting a trunk unlatch command signal to said trunk unlatching actuator for unlatching the trunk lid when said transmitter, carried by the authorized operator and, when operated, to transmit a coded unlatch signal, and said comparator means compares the signal received by said receiver with a preset code stored in the memory so as to determine whether the received code matches the preset code and, upon the match, to generate an unlatch signal, wherein said transmitter transmits a coded lock signal, when operated, and said comparator means compares the signal received by said receiver with a preset code stored in the memory so as to determine whether the received code matches the preset code and, upon the match, to generate a lock signal, said generated unlock signal, said lock signal, and said trunk unlatch signal corresponding to a request for unlocking the vehicle doors, a request for locking the vehicle doors, and a request for unlatching the trunk lid, respectively, and wherein said automatically door lock actuating means actuates said door lock actuator for locking the vehicle doors at an end of an extended time period of said first set time period up to which said extending means extends the first set time period if said trunk unlatch state detector determines that the trunk lid is unlatched and generates the unlatched signal during the counting operation of said first time period by said first timer unit and if said door switch outputs a door-closed signal when the vehicle doors are closed during the counting operation of said first set time period by said first timer unit.

3. An automatic door locking apparatus for an automotive vehicle for locking and unlocking vehicle doors as claimed in claim 2, wherein said trunk unlatched state detector determines that the trunk lid is unlatched and generates the unlatched signal when said receiver receives the signal from said transmitter, said comparator means compares the signal received with the preset code stored in the memory so as to determine whether the received code matches the stored preset code and, upon the match, to generate the unlatch signal, and said controller, responsive to the unlatch signal, outputs the trunk unlatch command signal to said trunk unlatching actuator so as to be actuated into an unlatching position to unlatch the trunk lid.

4. An automatic door locking apparatus for an automotive vehicle for locking and unlocking vehicle doors as claimed in claim 3, which further comprises a third timer unit for starting a counting operation of a third set time period for which the trunk lid is unlatched when said controller outputs the trunk unlatch command signal to said trunk unlatching actuator in response to the generation of the unlatch signal by said comparator means and wherein said door lock actuator automatically actuating means actuates said door lock actuator to lock the vehicle doors when said third set time period corresponding to said extended time period of said first time period is passed, unless said door switch outputs the door-open signal during the counting operation of said third set time period by said third timer unit.

5. An automatic door locking apparatus for an automotive vehicle for locking and unlocking vehicle doors as claimed in claim 4, which further comprises a second timer unit for starting a second set time period when said transmitter carried by the authorized operator, when operated, transmits the coded unlatch signal, said receiver receives the signal from the transmitter, said comparator means compares the signal received with the preset code so as to determine whether the received code matches the stored preset code and, upon the match, to generate the unlatch signal, and said controller outputs the trunk unlatch command signal to said trunk unlatching actuator for unlatching the trunk lid before said transmitter carried by the authorized operator transmits, when operated, the coded unlock signal, said receiver receives the signal from said transmitter, said comparator means compares the signal received with the stored preset code so as to determine whether the received code matches the stored preset code and, upon the match, to generate the unlock signal, and said controller outputs the door unlock command signal to said door lock actuator, and wherein, when said transmitter carried by said authorized operator, when operated, transmits the coded unlock signal, said receiver receives the signal from said transmitter, said comparator means compares the signal received with the stored preset code so as to determine whether the received code matches the stored preset code and, upon the match, to generate the unlock signal during the counting operation of the second set time period by said second timer unit, the counting operation of said third set time period is started by said third timer unit.

6. An automatic door locking apparatus for an automotive vehicle for locking and unlocking vehicle doors as claimed in claim 1, wherein said trunk unlatched state detector includes a trunk switch arranged for detecting whether the trunk lid is unlatched or not and for informing said controller of the unlatched state of the trunk lid in a form of the unlatched signal or of the latched state of the trunk lid in a form of a latched signal and wherein said controller includes said first set time period extending means, suspends the counting operation of said first set time period by said first timer unit when said controller receives the information of the unlatched state from said trunk switch during the counting of the first set time period by said first timer unit, and resumes the counting operation of said first set time by said first timer unit from which a value of the counted time at which the counting operation of the first set time period by said first timer unit is suspended is subtracted as a remaining time of the first set time period when said controller receives the information of the latched state of the trunk lid from said trunk switch while said controller suspends the counting operation of said first time period by said first timer unit.

7. An automatic door locking apparatus for an automotive vehicle for locking and unlocking vehicle doors as claimed in claim 6, wherein the start of the counting operation of the first set time period by said first timer unit is changed depending on whether the trunk lid is latched or unlatched according to a result of detection by said trunk switch with the vehicle doors closed, wherein said first timer unit starts the counting operation of the first set time period by said first timer unit immediately after said controller outputs the door unlock command signal to said door lock actuator for unlocking the vehicle doors in the case when said controller receives the information of the trunk lid unlatched state from said trunk switch, and wherein said first timer unit starts the counting operation of the first set time period by said first timer unit immediately after said controller receives the information of the latched state of the trunk lid from said trunk switch, said transmitter carried by the authorized operator, when operated, transmits the coded unlock signal, and said controller outputs the door unlock command signal to said door lock actuator for unlocking the vehicle doors, in the case when said controller receives the information of the unlatched state of the trunk lid from said trunk switch.

8. An automatic door locking apparatus for an automotive vehicle for locking and unlocking vehicle doors as claimed in claim 7, wherein said controller includes said door lock actuator automatic actuating means and wherein said controller actuates the door lock actuator for locking the vehicle doors when the remaining time of the first set time period has passed unless the door switch outputs the door-open signal within the remaining time of said first set time period.

9. An automatic door locking apparatus for an automotive vehicle for locking and unlocking vehicle doors as claimed in claim 8, wherein said door switch comprises a plurality of door switches, connected in parallel to each other and connected to said controller, for outputting the door-open signal in a form of an OFF signal to said controller when any vehicle door is opened and for outputting the door-closed signal in a form of an ON signal to said controller when all of the vehicle doors are closed.

10. An automatic door locking apparatus for an automotive vehicle for locking and unlocking vehicle doors as claimed in claim 1, wherein said first set time period counted by said first timer unit is approximately 30 seconds.

11. An automatic door locking apparatus for an automotive vehicle for locking and unlocking vehicle doors as claimed in claim 4, wherein said third set time period is approximately 80 seconds.

12. An automatic door locking apparatus for an automotive vehicle for locking and unlocking vehicle doors as claimed in claim 5, wherein said second set time period is approximately 8 seconds.

13. An automatic door locking method for an automotive vehicle with a door locking apparatus comprising: (a) a door lock actuator mounted in the vehicle for selectively locking and unlocking vehicle doors; (b) a transmitter carried by an authorized operator and, when operated, to transmit a coded unlock signal; (c) a receiver, arranged in the vehicle, for receiving the signal from said transmitter, said receiver having a memory for storing a preset code; (d) a comparator means for comparing the signal received with the preset code stored in the memory so as to determine whether the received code matches the preset code and, upon a match, to generate an unlock signal; (e) a controller connected to said door lock actuator for outputting a door unlock command signal to said door lock actuator for unlocking the vehicle doors; (f) a door switch for outputting a door-open signal when a door of the vehicle is opened; and (g) a first timer unit for starting a counting operation of a first set time period responsive to the unlock signal, said automatic door locking method comprising the steps of:

actuating said door lock actuator to lock the doors unless the door-open signal is outputted during the first set time period;

determining whether a trunk lid is unlatched or not during said counting operation;

generating an unlatched signal if sensed unlatched at the determining step; and extending the first set time period when the unlatched signal is generated.

14. An automatic door locking apparatus for an automotive vehicle for locking and unlocking vehicle doors, comprising:

a door lock actuator mounted in the vehicle for selectively locking and unlocking the vehicle doors;

a transmitter carried by an authorized operator and, when operated, to transmit a coded unlock signal;

a receiver, arranged in the vehicle, for receiving the signal from said transmitter, said receiver having a memory for storing a preset code;

a comparator for comparing the signal received with the preset code stored in the memory so as the determine whether the received code matches the preset code and, upon a match, to generate an unlock signal;

a controller connected to said door lock actuator for outputting a door unlock command signal to said door lock actuator for unlocking the vehicle doors;

a door switch for outputting a door-open signal when a door of the vehicle is opened;

a first timer unit for starting a counting operation of a first set time period responsive to the unlock signal;

an automatic actuator for automatically actuating said door lock actuator to lock the doors unless the door-open signal is outputted during the first set time period;

a trunk unlatched state detector for determining whether a trunk lid is unlatched or not during said counting operation and, if sensed unlatched, for generating an unlatched signal; and an extender for extending the first set time period when the unlatched signal is detected.

* * * * *